Feb. 26, 1963   H. J. WILLIAMS   3,078,669
FUEL FEED DEVICE FOR GAS TURBINE ENGINES
Original Filed May 16, 1946   3 Sheets-Sheet 2
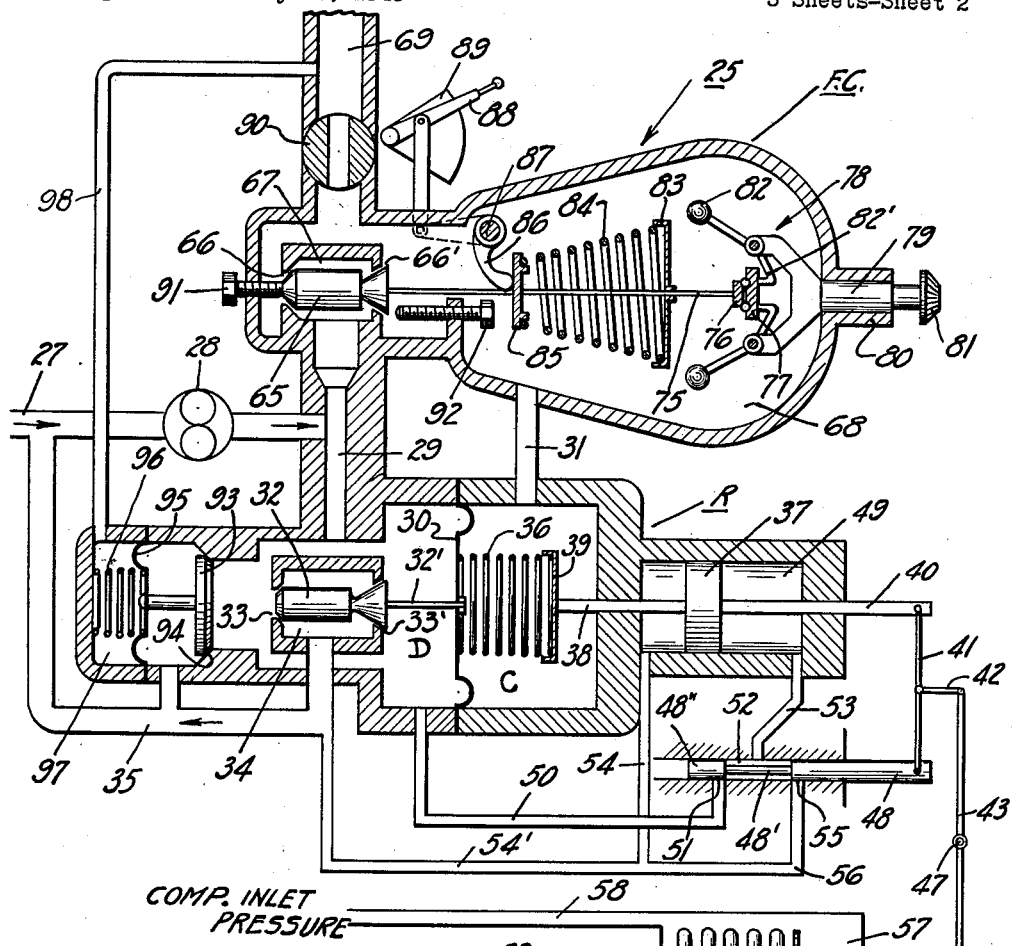
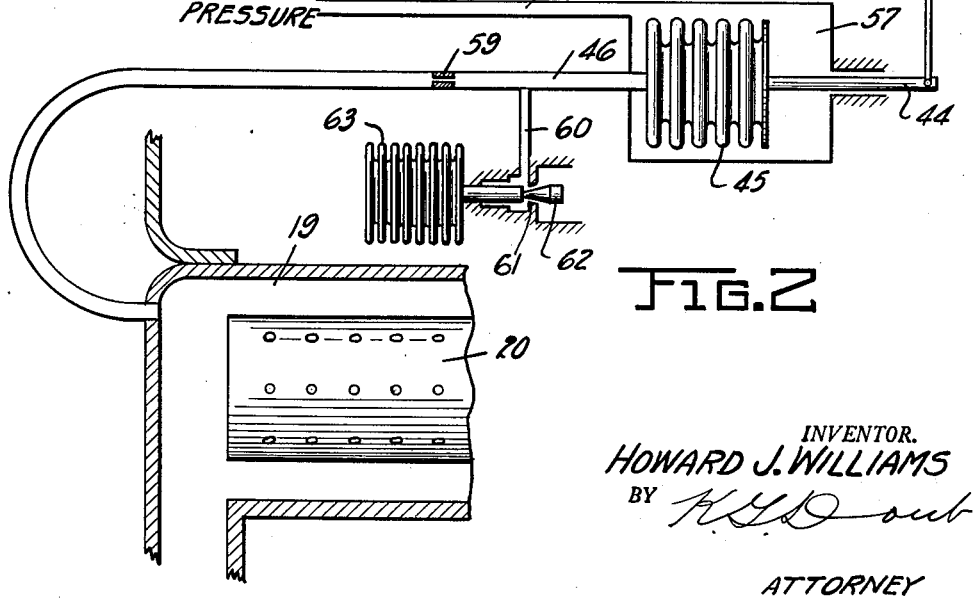
FIG. 2
INVENTOR.
HOWARD J. WILLIAMS
BY
ATTORNEY Feb. 26, 1963 H. J. WILLIAMS 3,078,669
FUEL FEED DEVICE FOR GAS TURBINE ENGINES
Original Filed May 16, 1946 3 Sheets-Sheet 3

INVENTOR
HOWARD J. WILLIAMS
BY
ATTORNEY

United States Patent Office 3,078,669
Patented Feb. 26, 1963

3,078,669
FUEL FEED DEVICE FOR GAS
TURBINE ENGINES
Howard J. Williams, South Bend, Ind., assignor to The
Bendix Corporation, a corporation of Delaware
Continuation of abandoned application Ser. No. 670,124,
May 16, 1946. This application Oct. 5, 1953, Ser. No.
384,111
31 Claims. (Cl. 60—39.28)

This application is a continuation of my now abandoned copending application Serial No. 670,124, filed May 16, 1946, covering a fuel feed device for gas turbine engines.

This invention relates to a fuel feed and power control device for gas turbines, jet propulsion machines or engines, and like power plants utilizing the force or energy produced by the combustion and expansion of fuel and precompressed air; it is particularly adapted for jet propulsion power plants for aircraft wherein the air is compressed into a chamber constituting part of a generator, at which point it is heated by the combustion of fuel and air, and the products of combustion passed through a turbine for driving a compressor and then discharged through a reaction jet to propel the aircraft; and power plants for aircraft wherein a gas turbine drives the propeller of the aircraft and may in addition drive a compressor for supplying air to a combustion chamber or generator, and wherein also the exhaust from the turbine may be discharged through a reaction jet to obtain a propulsion effect augmenting that of the propeller.

An object of the invention is to provide a relatively simple, yet highly effective fuel feed and power control device for power plants of the type specified.

Another object is to provide a fuel feeding system for aircraft power plants of the gas turbine or jet propulsion type which will leave the pilot or operator free to accelerate and decelerate at all times without danger of overheating the burner system or causing burner failure.

Another and more specific object is to provide a fuel feeding device for power plants of the type specified wherein the rate of fuel feed constitutes a function of engine or turbine speed and the pressure rise across the compressor and/or mass air delivery of the compressor.

A further object is to provide a device for feeding fuel to burners of a gas turbine engine or power plant for aircraft wherein the fuel metering differential across a variable feed restriction may be automatically regulated for a given area of said restriction by a fuel valve responsive to the rise across the compressor.

The foregoing and other objects and advantages will become apparent in view of the following description taken in conjunction with the drawings, wherein:

FIGURE 2 is a detailed view in sectional diagram of the fuel feed and power control device.

Figure 1:
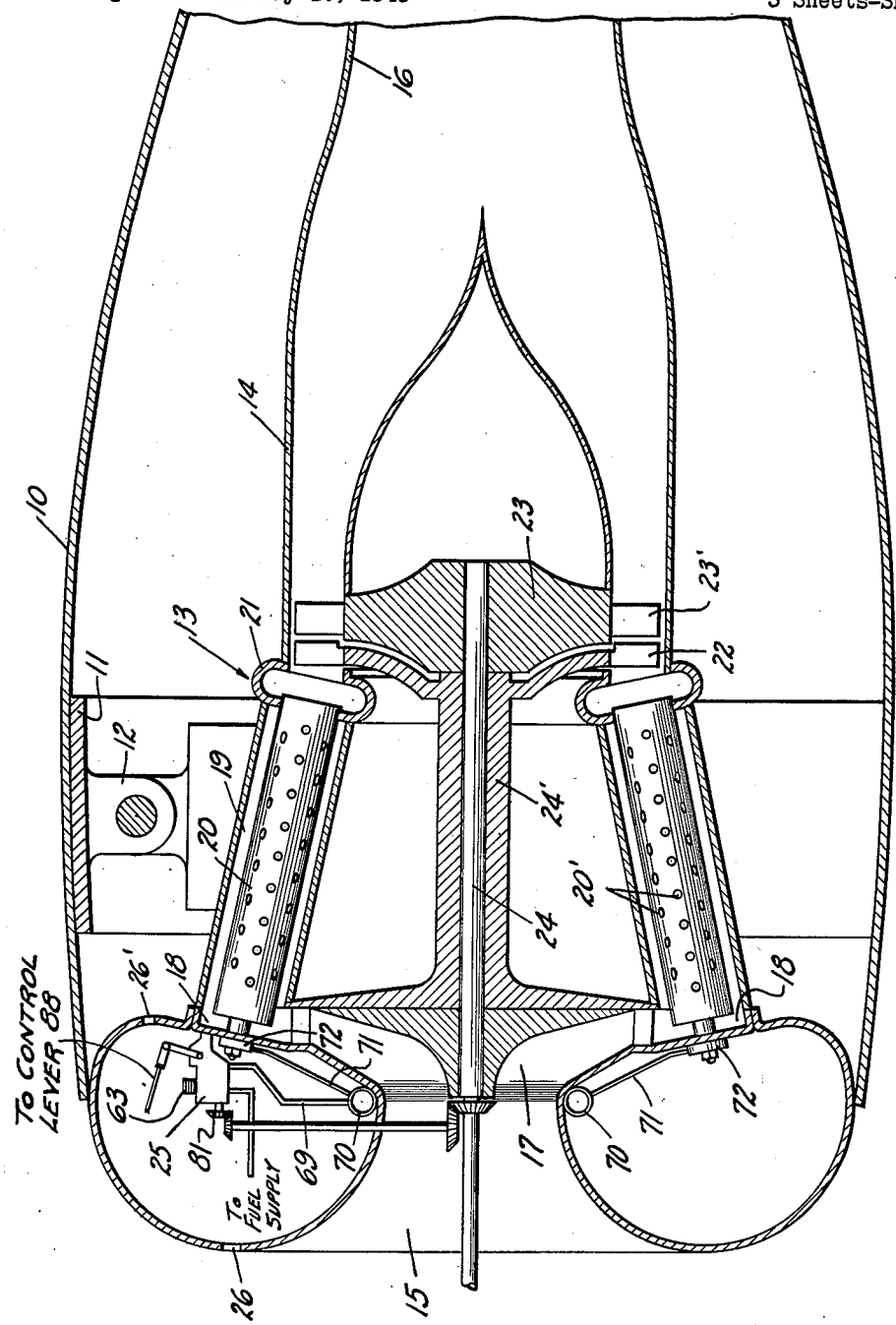
FIGURE 1 is a substantially central longitudinal sectional view of a gas turbine or jet propulsion machine or engine incorporating a fuel feed and power control device in accordance with the present invention.

Referring first to FIGURE 1, an aircraft engine nacelle, indicated at 10, has supported therein as by means of ring 11 and brackets 12 a jet propulsion engine or gas turbine power plant generally indicated at 13 and including an outer casing 14, flared or curved at its front extremity to define an air inlet 15 and contoured at its rear extremity to define a reaction tube 16. A rotary air compressor 17, shown as a centrifugal blower but which may also be of the axial flow type, forces air into an annular header 18 which supplies it to a plurality of peripherally spaced generator or burner chambers 19 containing burners 20 having air inlet holes 20' in the peripheral walls thereof. The burners 20 discharge into a collector ring 21 arranged to deliver the hot air and products of combustion through a set of stationary or stator blades 22 against the blades 23' of a turbine rotor 23. The turbine 23 and air compressor 17 are mounted on a common shaft 24 rotatably supported by a bearing 24'. Air entering the inlet 15 is picked up by the compressor, which acts to direct the air into the chamber 18 and generators 19 and thence into the burner 20 through the holes 20', where heat is added by the combustion of fuel. The expanded air and products of combustion are directed against the blades 23' of the turbine 23 to drive the compressor and are then discharged to the atmosphere through the reaction tube 16 to effect propulsion of the plane. Propulsion of the plane may also be accomplished by a propeller driven off of a forward extension of the shaft 24, usually through suitable reduction gearing, not shown.

Referring now to FIGURE 2, the various parts of the fuel metering and power control device are shown schematically but in the device as actually built, the parts may be arranged compactly in a single unit or housing generally indicated at 25, which as indicated in FIGURE 1 may be located in the annular chamber defined by the flared front extremity of the casing 14 and which chamber is vented to atmospheric air or ram pressure by means of holes 26 and 26'. The device in general is made up of a regulator section R and a fuel control section FC. A fuel inlet conduit 27 receives fuel from a suitable source such as a supply tank, not shown, and has mounted therein a fuel-pressuring means such as an engine or turbine-driven pump 28 which delivers fuel under pressure to a conduit 29, the latter at one end communicating with chamber D of regulator R and which may be aptly termed the "unmetered fuel chamber." A diaphragm 30 forms a movable partition or wall between chamber D and a chamber C, the latter being vented to the metered fuel area of the fuel control unit by conduit 31 and hence may be termed the "metered fuel chamber" of the regulator. A regulator valve 32 is connected by stem 32' to the diaphragm 30, said valve being of the balanced type and controlling by-pass ports 33, 33', through which fuel may flow into valve chamber 34 and thence through by-pass conduit 35 back to the low pressure side of the pump 28.

A spring 36 is mounted in chamber C and is adapted to urge the diaphragm 30 in a valve-closing direction against the resistance of unmetered fuel pressure. Means are provided for variably loading said spring in relation to the pressure rise across the compressor; such means in the form shown consists of a servo motor including a piston 37 having a stem 38 connected to a backing plate 39 engaging the spring 36 and another oppositely projecting stem 40 connected through linkage 41, 42 and 43 with a stem 44 carried by the free or movable end of a pressure responsive element or bellows 45, the interior of which is vented to compressor discharge pressure by way of pipe or conduit 46. Link 43 is fulcrumed or pivotally anchored at 47, and link 41 is movably fulcrumed or pivoted to link 42, the one end of link 41 being pivotally connected to servo valve 48 formed with a relieved portion 48' and valve portion 48". The servo operates through fuel pressure and is therefore a self-contained unit, servo piston 37 being mounted in a cylinder 49 to which high pressure fuel may be communicated to one side or end of the piston from chamber D of the regulator by way of pipe or conduit 50, valve port 51, valve chamber 52 and conduit 53, the opposite end of chamber 49 being vented to the low pressure fuel conduit 35 by means of conduits 54, 54'; high pressure fluid or fuel may also be relieved from valve chamber 52 by way of valve port 55 and conduit 56.

Bellows 45 is mounted in a chamber 57 which is vented to compressor inlet or ram pressure through passage 58; to provide means for regulating the effective travel of said bellows in relation to changes in air density, a fixed restriction 59 is provided in pipe or conduit 46, and beyond this restriction is a bleed passage 60 communicating with compressor inlet or ram pressure (although it may communicate with atmospheric pressure if desired) through valve port or variable restriction 61, the area of which is regulated by aneroid needle 62 controlled by capsule or bellows 63 which is responsive to changes in both pressure and temperature and therefore density and preferably located at a point where it is subjected to air intake or ram pressure and temperature.

A feed or throttle valve 65 of the balanced type coacting with feed or metering restrictions or ports 66, 66' controls the flow of fuel to the burners, said ports 66, 66' communicating valve chamber 67 with chamber 68, from which fuel flows by way of conduit 69 to manifold ring 70, note FIGURE 1, and thence through tubes or pipes 71 to fuel discharge nozzles 72, which may be of any desired type, for example, such as those shown in the copending application of Frank C. Mock, Serial No. 557,812, filed November 9, 1944, now Patent No. 2,581,276.

Feed valve 65 is provided with a stem 75 which projects into chamber 68 and has mounted on the outer end thereof a thrust bearing assembly comprising an inner race plate 76 and an outer thrust or contact plate 77. An all speed governor, generally indicated at 78, has a stub shaft 79 mounted in a bearing 80 and provided on its outer end with a pinion gear 81 adapted to be driven by the engine or from some part which rotates in relation to engine speed. The governor carries centrifugal weights 82 having fingers 82' adapted to engage contact plate 77.

Fixed on the stem 75 of the valve 65 is a retainer or abutment plate 83 and a spring 84, shown as of the conical or variable rate type, engaging said plate at its one end and at its opposite end being engaged by a thrust plate 85, freely movable with respect to the valve stem 75 and adapted to be engaged by a lever 86 secured on a throttle shaft 87, the latter connecting through suitable linkage with power control or throttle lever 88 mounted on a quadrant 89 and preferably located in convenient reach of a pilot or operator.

A shut-off valve 90 is provided for positively shutting off flow of fuel to the burners.

An adjustable contact member such as screw 91 positively determines the idling position of throttle valve 65, and a similar screw 92 determines the maximum feed position of said valve.

A pressure relief or blow-off valve 93 controls a port 94 through which fuel under pump pressure may escape or by-pass back to the low pressure side of the fuel pump 28 if for some reason the pressure of unmetered fuel in the regulator rises above a predetermined value, for example, should the shut-off valve 90 be closed while the engine is in operation. Valve 93 is provided with a stem connected to a diaphragm 95 backed by a spring 96 tending to maintain the valve in a seated position, said spring being mounted in a chamber 97 which is vented to the fuel discharge conduit beyond valve 90 by way of pipe or passage 98. Spring 96 determines the pressure above fuel discharge pressure at which valve 93 will open.

The operation is as follows:

Ordinarily the system would be filled with fuel to the discharge nozzles 72, but assuming it to be empty at ground level, if the engine is cranked, fuel will flow through conduit 27 and thence under pump pressure by way of conduit 29 to chamber D of the regulator; metered fuel passing through metering restriction 66, 66' will flow through conduit 69 to manifold ring 70 and thence through fuel lines or tubes 71 to the discharge nozzles 72. Also, the chamber 68 will fill with metered fuel from which it will flow by way of passage 31 into chamber C of the regulator.

In a dynamic compressor, the pressure rise varies substantially as the r.p.m. squared times inlet pressure and inversely as the square root of the inlet air temperature, and in the system disclosed herein the regulator valve 32 is controlled in a manner such as to hold fuel flow within certain limits as determined by air flow during acceleration and deceleration of the engine. For any given position of the valve 65, the differential across said valve and hence the flow of fuel to the engine will be a function of the differential across the diaphragm 30 which in turn is proportional to the force applied by spring 36, an increase in the latter differential tending to close valve 32 and a decrease in such differential tending to open said valve.

To accelerate, the power control lever 88 is moved in a direction to compress the governor spring 84, whereupon the feed valve 65 will be moved toward open position against stop 92, thereby enlarging the area of the feed restrictions 66, 66' and simultaneously resetting the governor weights 82. Immediately there will be an increase in the flow of fuel to the burners followed by an increase in engine or turbine speed. As the engine speeds up, the compresor output or rise increases, and this rise in pressure is applied to the bellows 45, expanding the latter and, through linkage 43, 42, 41 causing movement of the servo valve 48 to the left. This opens port 51 and restricts escape port 55 and fuel under pressure flows from chamber D, conduits 50 and 53 to piston chamber 49 causing movement of the servo piston 37 to the left and compressing spring 36, thereby increasing the differential across diaphragm 30 and proportionally closing regulator valve 32 until the fuel differential across the metering restrictions 66, 66', and hence across the diaphragm 30, balances the spring force determined by the rise across the compressor. When the engine attains a speed consistent with the rate of fuel being fed as determined by the setting of the power lever, the governor weights balance the feed valve 65 against spring 84.

The foregoing conditions are reversed when the throttle valve 65 is moved in a direction to decrease the flow of fuel to the burners. As the engine slows down, there is a corresponding drop across the compressor and collapse of bellows 45, servo valve 48 moves to the right, uncovering escape port 55 and restricting high pressure fuel inlet port 51, whereupon piston 37 moves to the right, relieving the tension on spring 36 and reducing the differential across diaphragm 30. This opens valve 32 and the metering differential across the metering restrictions 66, 66' is reduced, until the fuel differential across diaphragm 30 balances air flow as determined by spring 36. When the speed of the engine is reduced to a point where the governor weights balance the force of spring 84, deceleration is complete and the engine then operates at a steady speed.

As the altitude increases, at a constant rate of fuel flow, the engine or turbine compressor speed will tend to increase due to the fact that the compressor tends to deliver less air as the density decreases and consequently requires less power to drive it; also, the decreased quantity of air results in less volume of exhaust gas, thereby tending to reduce the energy driving the turbine. Thus, in order to maintain a given turbine or engine speed with increase in altitude, the flow of fuel to the burners must be reduced.

With a governor balanced feed valve as illustrated in the present instance, the rate of fuel feed is such as to maintain a constant engine speed once the governor weights acting through the spring 84 balances the valve in the particular position determined by the setting of the power control lever 88. If a pilot or operator were to carefully "nurse" the power control lever during acceleration so as to adjust the feed valve in a manner such that the rate of fuel feed increases in direct relation to engine speed, compensation for changes in density by varying the differential across the valve would not be necessary.

However, if the rate of fuel feed for a given setting of the power control lever were determined solely by the governor, the valve would be extremely sensitive to slight changes in position. Again, in jet propulsion machines for aircraft, it may be desirable to limit the idling position of the feed valve to a relatively high idling speed to ensure against engine failure when in the air, and this correspondingly reduces the range of feed valve movement between low and high power settings. With such engines, when a pilot or operator accelerates, he usually moves the feed valve from a low speed position to the full open or maximum speed position, and if the differential across the valve is not then a function of mass air flow, or if the rate of fuel feed for a given power lever setting is determined solely by the governor, the ratio of fuel-to-air becomes so great as to cause dangerously high temperatures in the burner.

Thus it becomes desirable to vary the differential across the feed valve in relation to changes in mass air flow to avoid dangerously high temperatures in the burners during acceleration, to permit a less sensitive setting of the feed valve and to avoid burner blow-out and compressor surge or stall. The bellows 45 and coacting parts control the differential with variations in speed at a given altitude, while the bellows 63 and valve 62 function to modify the action of bellows 45 in response to variations in altitude.

As the density of the air decreases with increase in altitude and/or a rise in temperature, the bellows or capsule 63 expands, thereby enlarging the area of orifice 61 and bleeding down the effective pressure in the conduit or passage 46 downstream of the restriction 59 while an increase in density of the air causes the bellows 63 to collapse and reduce the area of the port 61, thereby increasing the effective pressure acting on the bellows 45. Since the effective travel of the bellows is proportional to the difference between compressor discharge pressure and air inlet pressure times air density, and since the differential across the diaphragm 30 is proportional to the spring force exerted thereon by spring 36 which in turn is proportional to bellows travel, the differential across the feed valve 65 is varied in direct relation to changes in air density.

FIGURES 3 to 6 inclusive, illustrate respectively, the pressure rise across the compressor vs. engine speed characteristic, the mass air delivery to the burners vs. engine speed characteristic, and the fuel feed vs. r.p.m. relationship at sea level and at altitude.

Figure 3:
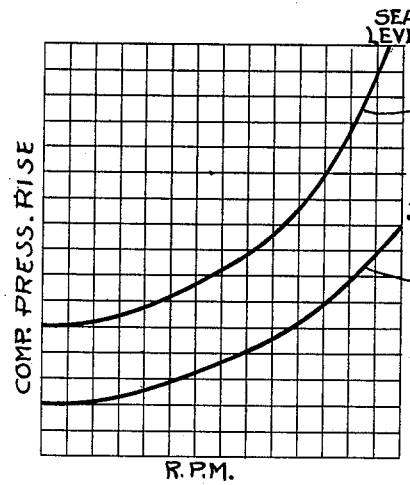
FIGURES 3 to 6 inclusive, are curve charts illustrative of the performance characteristics of the device.

In FIGURE 3, the curve 100 is meant to approximate a square curve and illustrates the rise across the compressor as the engine speeds up at sea level, while the curve 101 is a similar curve illustrating the compressor rise at some predetermined altitude, for example, 30,0000 feet.

Figure 4:
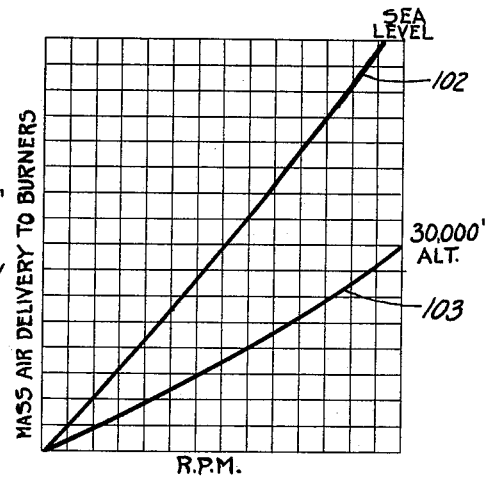

In FIGURE 4, curve 102 is almost a straight line since it indicates the flow of air through the compressor which varies substantially as the r.p.m., while the curve 103 is a similar curve illustrating the air flow at, for example, 30,000 feet.

Figure 5:
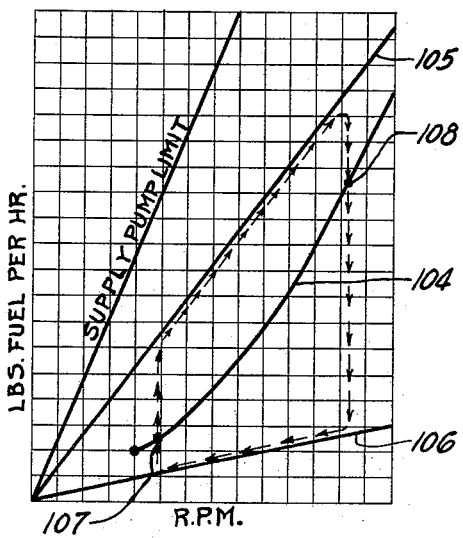

In FIGURE 5, the curve 104 indicates the rate of fuel feed required for steady operation at various speeds at ground level. The line 105 indicates a rate of fuel feed which will give rapid acceleration but which at the same time will hold the ratio of fuel to air within safe temperatures, or within an upper temperature limit; it represents flow with valve 65 against stop 92 and it may be selected by adjusting said stop. The line 106 indicates a rate of fuel feed which will provide sufficient fuel to the burner nozzles during deceleration to prevent the burner flame from being snuffed out or which will maintain the burner flame high enough to prevent failure at the existing engine speed; it represents flow with the valve 65 against adjustable stop 91. Assuming it is desired to accelerate from point 107 (which can be taken as the idle position of the throttle valve) to the point 108, then the power lever 88 would be moved to the right, depressing governor spring 84 and opening valve 65, whereupon the fuel feed would follow the vertical arrows to line 105 as the area of feed restrictions 66, 66' is suddenly increased, thence along this line as the regulator valve 32 gradually closes due to the rise in the differential across diaphragm 30 following an increase in engine speed, and then back to point 108 as the governor balances the force of spring 84 and reduces the opening of valve 65. It should be noted that the regulator is in balance all along the upper flow limit, and even though the valve 65 may be wide open from point 107 to point 108, the differential thereacross is regulated to maintain the fuel feed within limits consistent with the flow of air to the burners and hence burner temperature is also kept within predetermined limits.

If now it is desired to decelerate from the point 108 back to point 107, power lever 88 would be moved back to the left, releasing governor spring 84 and closing throttle valve 65, whereupon there will be a decrease in feed of fuel to the burners as indicated by the downwardly extending arrow lines until the lower fuel feed limit line 106 is reached, thence back along this line as the regulator valve 32 gradually moves toward open position due to the decrease in the differential across diaphragm 30 following a decrease in engine speed.

Thus the rate of fuel feed to the burners during acceleration and deceleration may be maintained consistent with engine speed and air flows to avoid dangerously high temperatures and snuffing out of the burner while at the same time providing sufficient fuel for the desired response to throttle adjustment.

Figure 6:
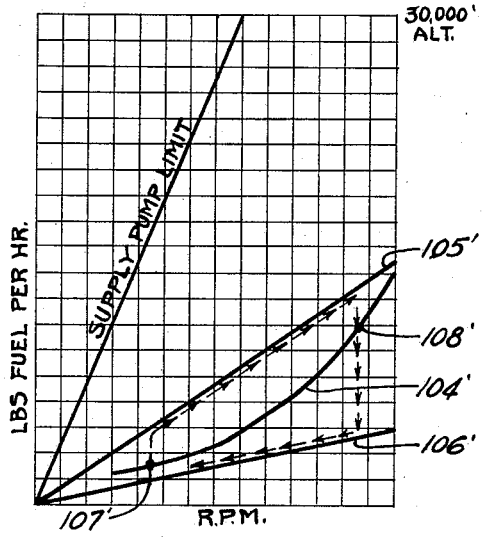

Upon a decrease in density of the air flowing to the burners, less fuel is required to drive the turbine and compressor at a given speed, and unless the rate of fuel delivered to the engine on acceleration is held within limits consistent with mass air supply to the burners, much higher temperatures will be experienced during acceleration at altitude than at corresponding conditions at sea level, due to the richer fuel-air ratios. FIGURE 6 is similar to FIGURE 5 except that it illustrates acceleration and deceleration characteristics at a high altitude, for example, 30,000 feet, similar reference numerals being used with a prime (') exponent added.

While a manually-actuated governor type of throttle valve is shown, it will be understood that the herein-disclosed system is applicable to gas turbines and jet engines having other types of throttle controls. Thus where a propeller is driven by the turbine, the governor may be omitted and the throttle valve directly connected to the throttle control mechanism.

Other modifications in design, arrangement, and construction of parts are contemplated within the scope of the invention as herein disclosed.

I claim:

1. In a system for controlling the rate of liquid fuel feed to a burner of a gas turbine engine utilizing a dynamic air compressor, means providing a fuel restriction, a valve means for controlling the area of said restriction, means for effectively resetting said valve means to select an operating speed for the engine, a flow regulating valve in flow controlling relation with said valve means, pressure responsive means operatively connected to said flow regulating valve, an air pressure responsive member, an operative connection between said pressure responsive means and said member, conduit means connecting said member to the discharge side of the air compressor whereby said flow regulating valve is controlled as a function of compressor discharge pressure, and a passage connecting said pressure responsive member to the inlet side of the air compressor whereby said flow regulating valve is controlled by a force which varies as a function of compressor discharge pressure modified by compressor inlet pressure.

2. In a system for controlling the rate of fuel feed to the burner or burners of a gas turbine engine which includes a dynamic air compressor whose pressure rise varies as a function of engine speed and compressor inlet pressure and temperature, a fuel conduit for conducting fuel under pressure to the burner having a variable metering restriction therein, power control mechanism including a feed valve for varying the area of said restriction, governor means driven by the engine operatively connected to said valve, a regulator valve for controlling the fuel metering head across said restriction, a pressure-responsive means connected to said regulator valve, means for subjecting said pressure responsive means to a force varying with variations in the drop across said metering restriction, means for also subjecting said pressure responsive means to a force derived from the rise across said air compressor, said forces being in opposition and balancing one another to maintain said regulator valve in equilibrium for a given position of said feed valve at a steady engine speed and functioning to maintain fuel flow substantially proportional to air flow during acceleration of engine.

3. A system as claimed in claim 2 plus means responsive to changes in pressure and/or temperature of the air flowing to the engine for modifying the force derived from the rise across the air compressor.

4. In a system for controlling the rate of liquid fuel feed to the burner of a gas turbine utilizing a dynamic air compressor, a fuel supply conduit having a restriction therein, a valve means for controlling the area of said restriction, means for effectively resetting said valve means to select an operating speed for the engine, a flow regulating valve in said conduit in flow controlling relation with said valve means, a pressure-responsive device, an operating connection between said device and regulating valve, and means for subjecting said pressure-responsive device to air compressor outlet pressure modified by compressor inlet pressure.

5. In a system for controlling the rate of fuel feed to the burner or burners of a gas turbine engine utilizing a dynamic compressor whose pressure rise varies as a function of engine speed and compressor inlet pressure and temperature, a fuel conduit for conducting fuel under pressure to the burner having a variable metering restriction therein, power control mechanism including a feed valve for varying the area of said restriction, governor means driven by the engine operatively connected to said valve, a regulator valve for controlling the fuel metering head across said restriction, diaphragm means connected to said regulator valve, means for subjecting said diaphragm means to a force varying with variations in the drop across said metering restriction, means for also subjecting said diaphragm means to a force derived from the rise across said compressor, said forces being in opposition and balancing one another to maintain said regulator valve in equilibrium for a given position of said feed valve at a steady engine speed and functioning to maintain fuel flow substantially proportional to air flow during acceleration of the engine, means responsive to changes in pressure and/or temperature of the air flowing to the engine for modifying the force derived from the rise across the compressor, the means for subjecting the diaphragm means to a compressor rise force comprising a servo-motor and coacting servo-valve controlled by a pressure-responsive member subjected to the rise across the compressor.

6. In a system for controlling the rate of fuel feed to the burner or burners of a gas turbine engine utilizing a dynamic air compressor whose pressure rise varies as a function of the speed of the engine and compressor inlet pressure and temperature, a fuel conduit for conducting fuel under pressure to said burner or burners having a variable metering restriction therein, a throttle valve for varying the effective area of said restriction, an adjustable all-speed governor operatively connected to said throttle valve, a power control device operatively connected to said governor and valve for accelerating and decelerating the engine to a selected speed, a regulating valve for controlling the fuel head across said restriction, pressure responsive means operatively connected to said regulating valve for moving the latter to different flow regulating positions, and means for subjecting said pressure responsive means to a differential pressure consisting of a force derived from the drop across said metering restriction and an opposed force derived from the air pressure rise across said air compressor, whereby during acceleration and/or deceleration following a change in setting of said all-speed governor and throttle valve the maximum and/or minimum rates of fuel feed are maintained within predetermined upper and/or lower limits.

7. A system as claimed in claim 6 wherein means responsive to variations in the pressure and/or temperature of the air flowing to the engine are provided for modifying the force derived from the rise across the air compressor.

8. In a system for controlling the rate of fuel feed to the burner or burners of a gas turbine engine utilizing a dynamic air compressor whose pressure rise varies as a function of engine speed and compressor inlet pressure and temperature, at least one fuel nozzle adapted to discharge fuel continuously while the engine is in operation, a fuel control device, and a fuel supply pump for pressurizing fuel to and through said device and nozzle; said device comprising a throttle valve and an interconnected adjustable all-speed governor, a power control member arranged to reset said governor and valve for accelerating and decelerating the engine to a selected speed, a regulating valve for controlling the fuel head across said throttle valve, pressure responsive means operatively connected to said regulating valve, means operatively connected to and subjecting said pressure responsive means to a differential pressure consisting of a force derived from the drop across said throttle valve and an opposed force derived from the air pressure rise across said air compressor, whereby during a transitional speed change following a change in the setting of said governor the rate of fuel feed will be maintained within upper and/or lower predetermined limits.

9. In a system for controlling the rate of fuel feed to the burner of a gas turbine engine utilizing a dynamic air compressor, means providing a fuel metering restriction, a throttle valve for controlling the area of said restriction, means for resetting said throttle valve to select an operating speed for the engine, means directly responsive to the inlet and discharge pressures of said air compressor for regulating the fuel metering head across said metering restriction, and means for modifying the action of the pressure responsive means as a function of compressor inlet pressure and temperature.

10. In a device for controlling the flow of fuel to the burner of a gas turbine engine utilizing a dynamic compressor wherein the pressure rise across the compressor varies as a function of engine speed and air density, a fuel conduit for conducting fuel under pressure to the burner having a variable metering restriction therein, a fuel pump arranged to pressurize the fuel in said conduit, power control mechanism including a feed valve for varying the area of said restriction, a regulator including a regulator valve arranged to by-pass fuel from the high pressure side to the low pressure side of said fuel pump, a diaphragm connected to said valve, said diaphragm providing in said regulator an unmetered fuel chamber on one side thereof and a metered fuel chamber on the opposite side whereby the diaphragm is subjected to a differential pressure proportional to the drop across said metering restriction, a spring in said metered fuel chamber adapted to act on said diaphragm, a servo motor arranged to vary the tension of said spring and including a servo valve controlling flow of fuel from the high pressure side of said pump to said servo motor and the escape of operating fuel from said servo motor back to the low pressure side of said pump, a member movable in response to the rise in pressure across said compressor for controlling said servo valve whereby the tension of said spring and hence the differential across said diaphragm is rendered proportional to the travel of said member, and means responsive to changes in air density for modifying the action of said member.

11. In a device for controlling the flow of fuel to the burner of a gas turbine engine utilizing a dynamic compressor wherein the pressure rise across the compressor varies as a function of engine speed, a fuel conduit for conducting fuel under pressure to the burner having a variable metering restriction therein, power control mechanism including a feed valve for varying the area of said restriction, a regulator valve controlling the drop across said restriction, a diaphragm connected to said regulator valve for determining the effective flow regulating position thereof, means for subjecting said diaphragm to a force varying with variations in the drop across said restriction, a spring backing up said diaphragm, a servo motor arranged to vary the tension of said spring, and means responsive to the rise across said compressor for operating said servo motor.

12. In a system for controlling the rate of fuel feed to the burner of a gas turbine engine utilizing a dynamic air compressor, a fuel supply conduit having a restriction therein, valve means for controlling the area of said restriction, a flow regulating valve in said conduit in flow controlling relation with said valve means, a pressure responsive device, an operating connection between said device and said regulating valve, and means for subjecting said pressure responsive device to compressor discharge pressure modified by compressor inlet pressure.

13. In a system for controlling the rate of fuel feed to the burner of a gas turbine engine having a compressor, a fuel supply conduit for conducting fuel to the burner, valve means in said conduit for controlling the flow of metered fuel therethrough, and means for controlling said valve means including an all-speed governor, means for resetting said governor to select an operating speed for the engine, and means responsive to burner inlet pressure operatively connected to said valve means for controlling said valve means as a function of said pressure.

14. In a system for controlling the rate of fuel feed to the burner of a gas turbine engine having a compressor, a fuel supply conduit for conducting fuel to the burner, valve means in said conduit for controlling the flow of metered fuel therethrough, and means for controlling said valve means including an all-speed governor, means for resetting said governor to select an operating speed for the engine, means directly responsive to an air pressure generated by the compressor, and an operating connection between said last mentioned means and said valve means, whereby said valve means controls the flow of metered fuel to the burner as a function of engine speed and compressor generated pressure.

15. In a system for controlling the rate of fuel feed to the burner of a gas turbine engine, a fuel supply conduit for conducting fuel to the burner, a first valve member in said conduit for controlling the flow of fuel therethrough as a function of engine speed, all-speed governor means operatively connected to said valve member, manual control means operatively connected to said valve member through said all-speed governor for selectively setting said governor to become operative at any given selected engine speed, a second valve member in said conduit coacting with said first valve member for controlling the flow of fuel therethrough, pressure responsive means operatively connected to said second valve member, and means connecting said pressure responsive means with the inlet section of the burner.

16. Fuel control apparatus for a turbo-jet engine having an incorporated air compressor and a constant delivery pump associated with said engine for delivery of fuel thereto, comprising: control means responsive to the pressure differential between the compressor inlet and outlet pressures for deriving a control pressure from the pressure downstream from said pump, and regulating means responsive to said control pressure for regulating said downstream pressure and hence the fuel flow to the engine, whereby the fuel flow to the engine varies as a function of said pressure differential.

17. In a system for controlling the rate of fuel feed to a gas turbine engine having a burner and a compressor, a fuel supply conduit for conducting fuel to the burner, valve means in said conduit for controlling the flow of fuel therethrough, and means for controlling said valve means including a passage which connects a source of compressor generated air pressure to a source of pressure of the air flowing to the compressor, first and second restrictions in series in said passage, and means responsive to the pressure in said passage intermediate said restrictions and operatively connected to said valve means.

18. A fuel feeding system as claimed in claim 17 wherein means are provided for varying the area of one of said restrictions.

19. A fuel feeding system as claimed in claim 17 wherein a fluid pressure responsive means is provided for varying the area of one of said restrictions.

20. A fuel feeding system as claimed in claim 17 wherein a fluid temperature responsive means is provided for varying the area of one of said restrictions.

21. A fuel feeding system as claimed in claim 17 wherein valve means is provided for varying the area of said second restriction.

22. A fuel control system for an internal combustion engine comprising a pump for supplying fuel to the engine, a movable manual control, and means, responsive to the movement of said manual control and to pressure, speed and temperature conditions in said engine, for automatically regulating the pressure end flow of fuel from said pump to said engine in accordance with said pressure, speed and temperature conditions, and in proportion to the movement of said manual control, thereby producing a constant steady state engine speed corresponding to the position of said manual control, under varying engine pressure and temperature conditions.

23. A fuel control system for an internal combustion engine comprising: a pump for supplying fuel to the engine, a manual control; and means for automatically regulating the pressure and flow of fuel from said pump to said engine in accordance with pressure, speed and temperature conditions of the engine, and in proportion to the movement of said manual control, thereby producing a constant steady state engine speed corresponding to the position of said manual control, under varying engine operating conditions; said fuel flow regulating means including means for selectively changing the speed of the engine, and means for preventing "hunting" of said regulating means for the new selected speed.

24. For an internal combustion engine having an air compressor for supplying air thereto, a fuel supply system comprising: a manual control means, a constant capacity fuel pump, driven by the engine, for supplying fuel thereto, a by-pass relief valve around said pump for varying its delivery, and means, responsive to said manual control means, said engine speed and the rate of mass air flow through said engine, and acting on said valve, for automatically regulating the flow of fuel from said pump to said engine, so as to produce a constant steady state engine speed corresponding to the position of said manual control means, under varying engine operating conditions which affect said speed and rate of air flow.

25. A fuel control system according to claim 24, wherein the fuel flow regulating means comprises a plurality of component, coordinated hydraulic systems, respectively responsive to said speed and rate of air flow.

26. In a fuel supply system for an internal combustion engine, having a manual control, a constant capacity fuel pump, driven by the engine, for supplying fuel to the engine, a by-pass relief valve around said pump for varying the delivery of said pump, and means, responsive to said manual control, said engine speed, and to the rate of mass air flow through said engine, and acting on said valve, for automatically regulating the flow of fuel from said pump to said engine, so as to vary the steady state engine speed in proportion to the movement of said manual control means, under varying engine operating conditions which affect said speed and rate of air flow.

27. A fuel control system according to claim 26, wherein the fuel flow regulating means comprises a plurality of component, coordinated hydraulic systems, respectively responsive to said manual control, speed and rate of air flow.

28. In a system for controlling the rate of fuel feed to the burner of a gas turbine engine having a compressor, a fuel supply conduit for conducting fuel to the burner, valve means in said conduit for controlling the flow of metered fuel thereto, a pressure responsive member connected to said valve means for controlling said valve means as a function of the pressure acting on said pressure responsive member, a conduit operative to transmit a pressure generated by the engine compressor to said pressure responsive member to supply an actuating air pressure thereto, a fixed size restriction in said conduit intermediate the ends thereof for limiting air flow therethrough, variable restriction means operatively connected to said conduit downstream of said fixed size restriction operative to bleed varying quantities of air from said conduit to the atmosphere to vary the effective pressure acting on said pressure responsive member.

29. In a system for controlling the rate of fuel feed to the burner of a gas turbine engine as claimed in claim 28 wherein said variable restriction is automatically controlled in response to a parameter of engine operation.

30. In a system for controlling the rate of fuel feed to the burner of a gas turbine engine as claimed in claim 29 wherein said parameter of engine operation is the density of the atmosphere.

31. In a fuel supply system for an internal combustion engine, a constant capacity fuel pump, driven by the engine, for supplying fuel to said engine, a by-pass relief valve around said pump for varying the delivery of said pump, first means responsive to engine speed and to the rate of mass air flow through said engine for varying the opening of said valve, and means including said first means for automatically regulating the flow of fuel from said pump to said engine in accordance with predetermined engine operating requirements which are affected by said speed and rate of air flow, and means for preventing the speed and temperature of the engine from exceeding the predetermined maximum safe limits.

References Cited in the file of this patent

UNITED STATES PATENTS

| | | |
|---|---|---|
| 2,341,257 | Wunsch | Feb. 8, 1944 |
| 2,384,282 | Chandler | Sept. 4, 1945 |
| 2,422,808 | Stokes | June 24, 1947 |
| 2,469,678 | Wyman | May 10, 1949 |
| 2,531,780 | Mock | Nov. 28, 1950 |
| 2,581,276 | Mock | Jan. 1, 1952 |
| 2,592,132 | Feilden et al. | Apr. 8, 1952 |
| 2,616,254 | Mock | Nov. 4, 1952 |
| 2,667,743 | Lee | Feb. 2, 1954 |
| 2,668,416 | Lee | Feb. 9, 1954 |
| 2,673,556 | Reggio | Mar. 30, 1954 |
| 2,688,229 | Lee | Sept. 7, 1954 |
| 2,697,909 | Chandler | Dec. 28, 1954 |

UNITED STATES PATENT OFFICE
CERTIFICATE OF CORRECTION

Patent No. 3,078,669                      February 26, 1963

Howard J. Williams

It is hereby certified that error appears in the above numbered patent requiring correction and that the said Letters Patent should read as corrected below.

Column 5, line 53, for "30,0000" read -- 30,000 --.

Signed and sealed this 29th day of October 1963.

(SEAL)
Attest:
ERNEST W. SWIDER                      EDWIN L. REYNOLDS

Attesting Officer                      Acting Commissioner of Patents